(12) United States Patent
Lokowandt et al.

(10) Patent No.: US 8,688,547 B2  
(45) Date of Patent: Apr. 1, 2014

(54) LEAD TIME AND VALIDITY BASED SUPPLY DETERMINATION

(75) Inventors: Bernhard Lokowandt, Heidelberg (DE); Michael Segler, Wiesloch (DE); Stefan Siebert, Hockenheim (DE)

(73) Assignee: SAP AG, Walldorf (DE)

( * ) Notice: Subject to any disclaimer, the term of this patent is extended or adjusted under 35 U.S.C. 154(b) by 1670 days.

(21) Appl. No.: 11/644,582

(22) Filed: Dec. 22, 2006

(65) Prior Publication Data  
US 2008/0154414 A1    Jun. 26, 2008

(51) Int. Cl.  
*A01K 5/02* (2006.01)  
*G06F 17/50* (2006.01)  
*G06Q 10/00* (2012.01)

(52) U.S. Cl.  
USPC .......................... 705/29; 705/7.11; 705/7.12

(58) Field of Classification Search  
None  
See application file for complete search history.

(56) References Cited

U.S. PATENT DOCUMENTS

| | | | | |
|---|---|---|---|---|
| 7,343,212 | B1 * | 3/2008 | Brearley et al. | 700/106 |
| 7,437,205 | B2 * | 10/2008 | Knipfer et al. | 700/106 |
| 7,668,761 | B2 * | 2/2010 | Jenkins et al. | 705/28 |
| 2002/0032611 | A1 * | 3/2002 | Khan | 705/26 |
| 2002/0072988 | A1 * | 6/2002 | Aram | 705/26 |

* cited by examiner

*Primary Examiner* — Paul Danneman  
(74) *Attorney, Agent, or Firm* — Schwegman, Lundberg & Woessner, P.A.

(57) ABSTRACT

A system and method schedule manufacturing of a product by a requested availability date. Sources of supply are selected for a given material to be used for manufacturing the product. A check is then performed for each source of supply to ensure that a valid-to date of the source of supply is equal or later than a plan start date. Lead times for sources of supply are calculated having a valid-to date equal or later than a plan start date. A source of supply is selected as a function of a validity interval of the source and a validity date.

20 Claims, 5 Drawing Sheets

---

300

310 — SELECT FROM THE DATABASE ALL SOURCES OF SUPPLY FOR THE GIVEN MATERIAL AND SUPPLY PLANNING AREA. THE VALID-TO DATE OF THE SOURCE OF SUPPLY SHALL BE EQUAL OR LATER THAN THE PLAN START DATE

FOR ALL SELECTED SOURCES OF SUPPLY

315 — CALC CONSUMER LEAD TIME  
ValidityDate: = REQUESTED AVAILABILITY DATE - CONSUMER LEAD TIME 320 — CALC SUPPLIER LEAD TIME  
ValidityDate: = MAX(ValidityDate, PLAN START + SUPPLIER LEAD TIME 325 — DELETE SOURCE OF SUPPLY IF ValidityDate < VALID-FROM DATE OF SOURCE SUPPLY  
DELETE SOURCE OF SUPPLY IF ValidityDate > VALID-TO DATE OF SOURCE SUPPLY 330 — ALL REMAINING SOURCES OF SUPPLY ARE VALID  
CHOOSE ONE OF THE REMAINING SOURCES OF SUPPLY TO CREATE A NEW ORDER  
CHOOSE ValidityDate AS EXPLOSION DATE

LEAD TIME AND VALIDITY BASED SUPPLY DETERMINATION

BACKGROUND

MRP, material requirements planning, is a function or module that may be part of an overall computer implemented business management solution. An MRP run tries to cover material shortages related to manufacturing products by creating new material receipts (e.g. planned orders) for parts used in the manufacturing process. MRP should create production and procurement planning orders in such a way, that material requirements can be covered in time. The material availability date of the material receipt should be equal or earlier than the material requirement, which is covered by the material receipt. When MRP detects a material shortage, it only knows the required availability date.

Sourcing and bill of material (BOM) explosion typically depends on the order start date. The order start date may be calculated from the required availability date if the lead time were known. Unfortunately the lead time depends on the source of supply. Production could be performed on different resources with different processing speeds. A raw material could be procured from different suppliers requiring different transportation times. The problem is that sourcing and BOM explosion require knowledge about the lead time and the lead time can only be determined after sourcing. If a planned order end date is changed, then lead time scheduling is performed to determine the new order start date and BOM and routing are re-exploded using the new order start date. This approach has several disadvantages.

The user has to define the production lead time in the material master. This is somewhat redundant since the information is also available in the routing.

The production lead time in the material master is only a very rough estimate of the real production time. Since the production lead time is stored in the material master it does not depend on the source of supply. Different sources of supply (different production versions or different alternative routings) may however have different lead times.

Some MRP functions in business management systems use lead time scheduling to determine the target dates of the planned order. The scheduled dates of the planned order operations may differ from the target dates. BOM and routing may be invalid at the actual production start.

The system re-explodes un-firmed planned orders every time the order is rescheduled. This potentially destroys order information (especially scheduled dates of operations).

In a further business management system, planned orders are scheduled based on routing information. The system selects the source of supply based on the requirement date as the order start date is not yet known. It explodes BOM and routing using the requirement date. It then calculates the order start date using infinite scheduling based on the routing. If the first explosion result is invalid at the order start date, then a second explosion of BOM and routing is performed using the order start date calculated with the first routing explosion. This approach also has several disadvantages.

The system works on production durations, not lead times. The infinite scheduling performed by the system returns very optimistic estimates for the order start date. If several planned orders compete for the same resource then the estimated order start date is not feasible. The system is also based on an assumption that the production time does not change much over time. The second explosion of BOM and routing may however result in longer production lead times than the first explosion. If the second explosion is valid only for a short period of time (which happens in case of frequent engineering changes) then it may not be possible to schedule the order in the interval between the order start date calculated by the first explosion and the requirement date (in this the system will violate the requirement date).

The infinite scheduling used performed to determine the order start date is a complex procedure. The user does not know and has no means to find out how the source of supply was selected. The algorithm is also difficult to adapt to customer needs.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein are implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wireless transmissions. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

Production planning utilizes time dependent data. Especially BOM (bill of materials), BoO (bill of operations/routing), and sources of supply (also known as production model or production version) are frequently time dependent. Therefore production planning orders with different order start or order end dates may differ in components, resource requirements and structure. Production planning often solves conflicts like resource overloads, missing components, violated due dates etc., by rescheduling the production planning orders. Rescheduling production planning orders may require a re-explosion of BOM and BoO. The re-explosion may lead to different component demands which may cast doubt on the scheduling.

In a competitive environment manufacturers constantly strive to make their products more attractive to customers. At the same time manufacturers optimize the production process, which often also requires changes of either the product itself or of the way the product is manufactured. Components are replaced by other more advanced, more attractive or simply cheaper components. Operations are performed on more efficient machines in a shorter period of time in streamlined production processes.

Figure 1:
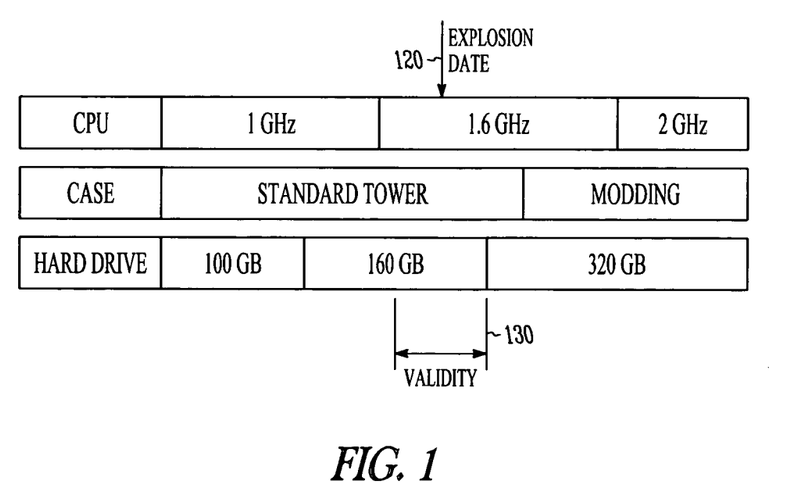
FIG. 1 is a block representation of a BOM for a personal computer illustrating changes to materials over time according to an example embodiment.

Typically these changes are planned in advance and become effective at a predefined future date. Several such changes can be planned in advance. Changes of different components or operations may depend on each other, but don't have to. Personal computers for example are equipped with ever faster CPUs, more memory, larger hard drives etc., over time as shown in FIG. 1 generally at 100. These components can be changed more or less independently at different dates. If changes depend on each other, then they have to become effective at the same date. As shown in an example BOM in FIG. 1, the central processing unit (CPU) changes at least twice over a five month period, while the case changes twice, and the hard drive also changes three times. In this example, none of the changes depend on each other, as the times they take effect are different.

The planning relevant BOM and BoO data defined in one production model is compiled into one object. This object is called the released planning production model (RPPM). The RPPM is generated when the latest BOM and BoO changes are released. BOM, routing/BoO, RPPM, recipe or other kind of process description can be exploded to create planned orders (production planning order).

RPPM explosion determines the required components, operations and capacity requirements. The explosion result depends on the order quantity and the explosion date. For every component RPPM explosion returns a unique component material, which depends on the explosion date. RPPM explosion determines the component material by evaluating the change states of the BOM items. The component quantity depends on the order quantity. In the following example RPPM explosion will determine component requirements for the 1.6 GHz CPU, the standard tower case and the 160 GB hard drive for the given explosion date indicated at 120 in FIG. 1.

Besides component and capacity requirements the explosion of the RPPM also determines an order validity interval 130. The order validity interval is the intersection of the validity interval of the production model and the validity intervals of all selected components and operations. If the order is rescheduled in such a way, that the explosion date 120 remains inside the order validity interval 130, then the order does not have to be re-exploded. If the order is rescheduled and the explosion date is outside the original order validity interval, then at least one order component or operation differs from what was planned by engineering. A re-explosion of the production planning order using the original order quantity and the new explosion date will adjust order components and order operations to what is defined in BOM and BoO.

Maintenance of BOM allows defining the valid from date and the valid to date for every component. The valid from date defines the first date the component is valid. The valid to date defines the last date the component is valid (valid from date and valid to date are a closed interval). Engineering changes become effective at the valid start date. The subsequent engineering change of the same component becomes effective after the valid end date.

Figure 2:
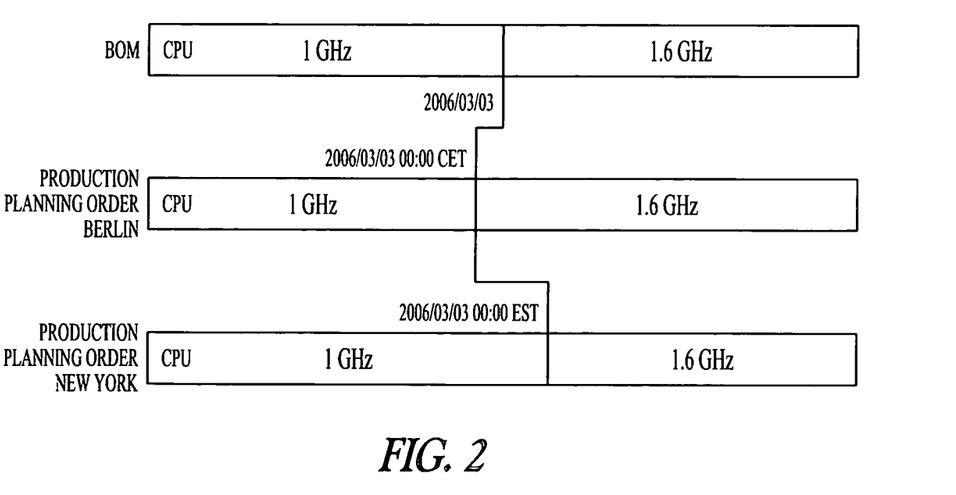
FIG. 2 illustrates engineering changes taking effect across various time zones according to an example embodiment.

The BOM does not define the hour when an engineering change becomes effective. By convention engineering changes become effective at midnight local time. If in a global enterprise the same BOM is used in different time zones, it is measured in UTC, engineering changes become effective earlier in eastern locations and later in more western locations as shown in FIG. 2, where changes become effective in Berlin before New York. Unlike the valid from and valid to dates in the BOM the order validity interval of the production planning order is stored as a pair of timestamps. The order validity start is 0:00 hours local time. The order validity end is 24:00 hours local time. Note, that the end time 24:00 equals 0:00 the next day. Therefore the validity end time is not included in the validity interval (the order validity interval is an upper open interval).

The order is used for scheduling. Operations of the order can potentially be scheduled with accuracy of seconds. The system may check if operations start inside the validity interval. To this end, operation timestamps are compared with the order validity interval. This is much simpler if order validity interval is also stored as timestamps.

In one embodiment, the time when engineering changes become effective is always midnight local time. If a manufacturing plant works 24 hours a day then the night shift often starts at 22:00 hours and ends at 06:00 hours the next day. Engineering changes may be easier to implement between shifts rather than in the middle of a shift. In this case it may be necessary to adjust the validity interval to the shifts. Engineering changes could become effective at 22:00 hours local time or at 06:00 hours the next day.

The explosion date controls the selection of components and operations during the explosion of the released planning production model RPPM. RPPM explosion returns all components and operations that are valid at the explosion date. In most cases the system is expected to use the components and operations that are valid at the production start date. If the production planning order is rescheduled, then the production start date changes. If the production start date is outside the validity interval of the original order, then the system shall re-explode the RPPM if possible in order to adjust the order components and operations to components and operations defined in the RPPM. In this case the planned start date of the production planning order equals the explosion date. The production start date rather than for example the production end date or any other date in the order is most often used to determine the explosion date for the following reason: Before production starts at least one component has to be withdrawn from inventory (this component is then processed first during production). This component should be compatible with all the other components required for the order. This can most easily be controlled if the order start date determines the explosion date. Even if the exact order start date would not be known until production actually starts you could still guarantee the correct usage of components by re-exploding the BOM at production start time.

If the order end date (or any other order date between order start and order end date) would be used as explosion date production planning could have the following difficulty: Suppose production has already started for a certain product. The first components were withdrawn from inventory. Suppose production has to be interrupted at this point of time. The interruption postpones the order end date. This could require a re-explosion of the BOM. At this point of time however a re-explosion of BOM and BoO is probably no longer possible. The new explosion result could be incompatible with what was already produced. Production planning would therefore have to live with production planning orders with an end date outside the validity interval of the order, which contradicts the initial assumption.

Prototypes, which may have an effective date far off into the future, may be built when desired by manually setting the explosion date. Since the explosion date is not changed during rescheduling it will always be inside the validity interval or the production planning order. Re-explosion of the RPPM is not required after rescheduling. In one embodiment, the explosion date for prototypes may be set manually. Then the order validity interval should be infinite. If the order validity interval is infinite, a re-explosion may not be required after rescheduling.

In the case of production the order start date determines the explosion date and the explosion date shall be inside the validity interval of the production planning order.

The concept of the temporal validity interval can also be applied to external procurement. The sources of supply for external procurement like for example contracts with the supplier are valid only for a limited period of time. The validity interval of a procurement planning order equals the validity interval of the source of supply. The order validity interval should include a reference date, which in the case of production is called the explosion date.

In case of external procurement you have to negotiate with the supplier who is responsible for shipping the material from the supplier to your location. If it is the supplier's responsibility, then your company requests the material for a certain delivery date and it is the supplier's responsibility to meet this delivery date. Contracts, delivery schedules etc. must be valid at the delivery date. If the supplier is responsible for delivery, then the reference date is the delivery date.

In case of external procurement it may also be your responsibility to pick up the material at the supplier location. In this case you agree with your supplier on the pick-up date. Contracts, delivery schedules etc. must be valid at the pick-up date. The reference date is the pick-up date. Sources of supply can be time dependent. Materials can be procured differently at different times. Contracts, delivery schedules, RPPMs etc. may be valid only for a limited period of time. BOM explosion returns the order validity interval, which further reduces the order validity interval. The system checks if the order validity interval includes the following reference dates: In case of external procurement and the supplier delivering the material to your location the system checks if the order validity interval includes the delivery date; In case of external procurement it may also be your responsibility to pick up the material at the supplier location. The system checks if the order validity interval includes the pick-up date. In case of production the order validity interval must include the explosion date. The explosion date defines the engineering changes, which shall be used by production. Note, that the explosion date is not necessarily identical with the order start date (is the case of prototypes for example).

If the delivery date or the pick-up date of a procurement planning order is outside the order validity interval then the order should either be rescheduled or a new source of supply should be determined. If the explosion date of a production planning order is outside the validity interval, then the order should either be rescheduled or re-exploded. In case of a re-explosion the validity of the source of supply (production model) needs to be checked. If necessary the system has to determine a new source of supply.

Rescheduling, selection of a new source of supply or re-explosion of a firmed order may be performed by the production planner. Supply chain exceptions notify the production planner about orders outside the validity interval. The following requirements define functions necessary to check the temporal validity of orders.

Production planning orders are typically created by an MRP run. The MRP run tries to cover material shortages by creating new material receipts. In case the material the procured from an external supplier MRP creates procurement planning orders. In case the material is manufactured MRP creates production planning orders. MRP should create production and procurement planning orders in such a way, that material requirements can be covered in time. The material availability date of the material receipt should be equal or earlier than the material requirement, which is covered by the material receipt. When MRP detects a material shortage it only knows the required availability date.

Sourcing and RPPM explosion however typically depend on the order start date. The order start date could be calculated from the required availability date, if the lead time were known. Unfortunately the lead time depends on the source of supply. Production could be performed on different resources with different processing speeds. A raw material could be procured from different suppliers requiring different transportation times. The problem is, that sourcing and RPPM explosion requires knowledge about the lead time and the lead time can only be determined after sourcing.

To solve this problem lead time calculation and sourcing are performed simultaneously using an algorithm that evaluates the following input parameters: Material; Supply planning area (location); Order quantity; Requested availability date; and Plan start date.

Planned material receipts with the start date in the past can not be procured in time. Procurement should have started some time in the past to make the requested availability date reality. Therefore planning into the past is often not permitted. The plan start date is set to the current date if planning into the past is not permitted. If planning needs some time to implement the plan, then the plan start date should be moved this period of time into the future. If planning into the past is allowed, then the plan start date could also be a past date.

Figure 3:
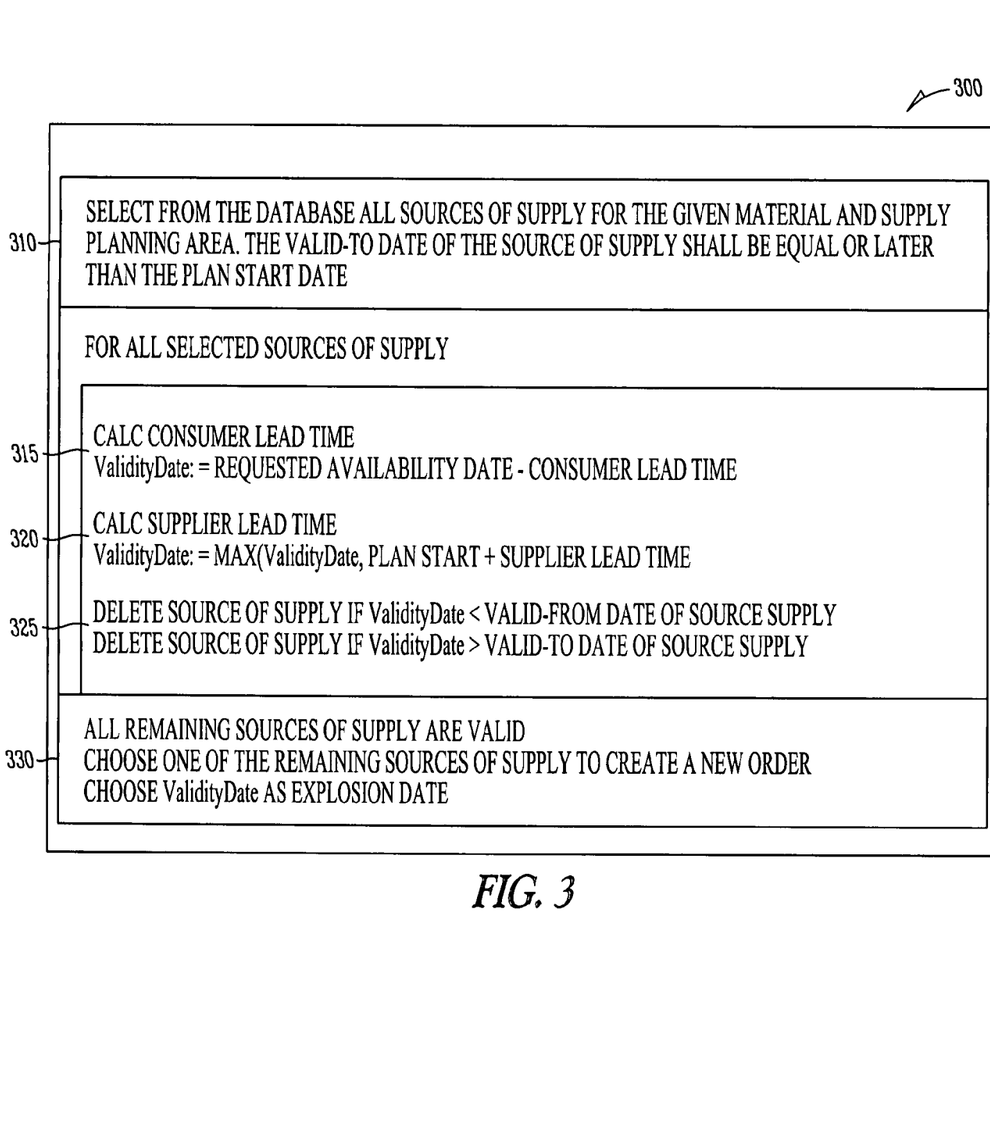
FIG. 3 illustrates source selection for a given material according to an example embodiment.

FIG. 3 illustrates a computer implemented method that selects sources of supply and an explosion date generally at 300. At 310 some or all sources of supply for the given material and supply planning area (location) are selected from the database. The algorithm also checks if the valid-to date of the source of supply is equal or later than the plan start date. This means, that the source of supply is valid for at least part of the planning period. Sources of supply with a valid-to date earlier than the plan start date are not valid during the planning period and therefore not selected. The system then calculates the lead times for all selected sources of supply. The algorithm differentiates between the consumer lead time at 315 and the supplier lead time at 320.

The validity interval of the source of supply defines the period in which the responsibility for the procurement process may be handed over from the supplier to the consumer. The consumer lead time is subtracted from the requested availability date in order to determine the validity date, which is checked against the validity interval of the source of supply. The consumer lead time includes the durations of the following tasks: In case of purchasing where the supplier is responsible for delivering the material to our location the consumer lead time includes the goods receipt processing time, i.e. the time needed to unload, check and transfer the material to storage; In case of external procurement where our company picks up the material at the supplier location the consumer lead time may include the goods receipt processing time and the transportation time from supplier to the consumer gate; and in case of production an estimate of the production lead time is computed.

The production lead time is quantity dependent. The lead time is computed with the formula ConsumerLeadTime=Quantity*A+B. The calculation of factors A and B is described below.

The source of supply must be valid at the time the material is handed over from the supplier to the consumer. The time of handover also depends on the time the supplier needs to provide the material. It should not be earlier than the plan start plus the supplier lead time. If this condition is violated the supplier will not be able to delivery the material in time. The supplier lead time includes the following durations: In case of purchasing where the supplier is responsible for delivering the material to our location the supplier lead time is equal to the planned delivery time; In case of external procurement where our company picks up the material at the supplier location the supplier lead time is the order-to-pick-up time; In case of production the supplier lead time is typically zero. In one embodiment, all required resources and components are available and production can start immediately. If we know, that the components can't be available because the components are subject to make-to-order planning, then a supplier lead time could also be used in the case of production and would represent lead time of component production.

At 325, sources are deleted if the validity date is less than the valid from date of source of supply, and if the validity date is greater than the valid-to date of the source of supply. All remaining sources of supply are valid as indicated at 330. One of the remaining sources of supply is selected to create a new order and the validity date is chosen as the explosion date.

Figure 4:
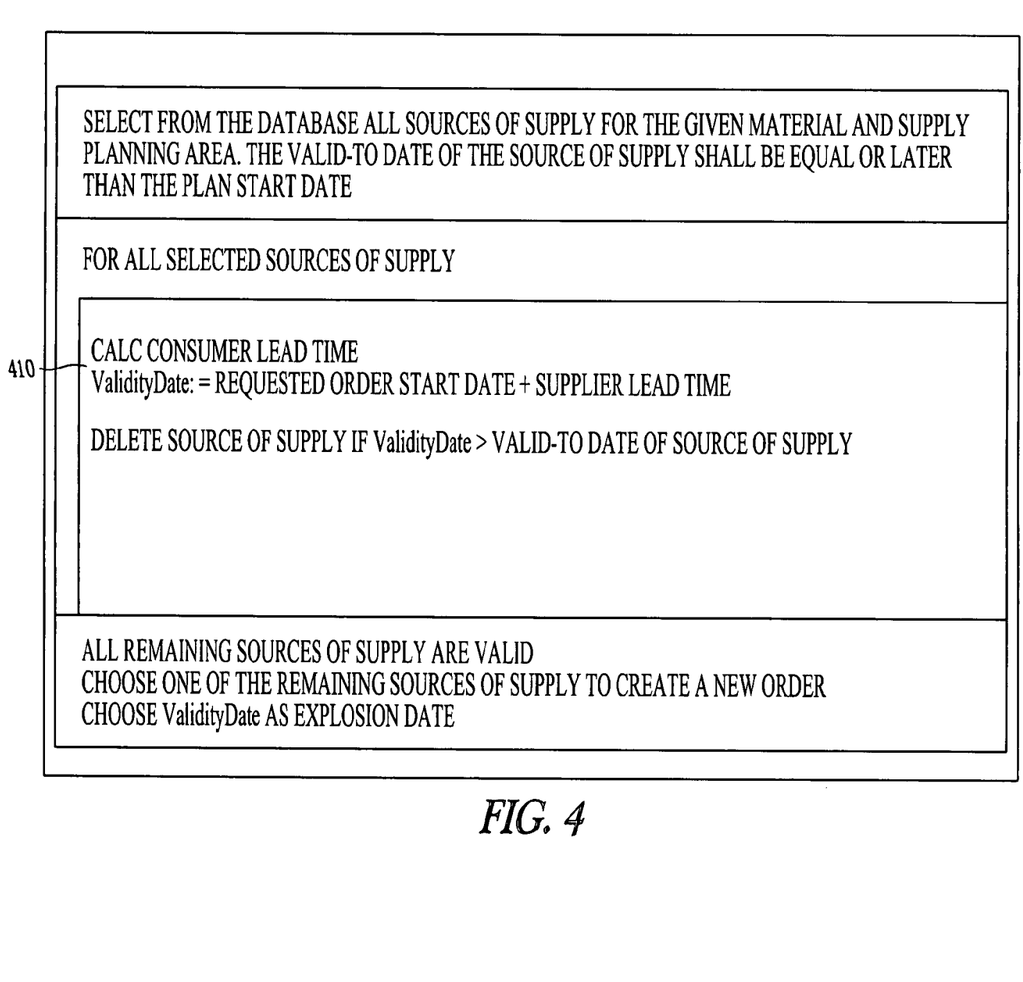
FIG. 4 illustrates an alternative method of source selection based on a requested order start date according to an example embodiment.

The algorithm described above is used to determine the source of supply for a given requested availability date. Production planning orders and procurement planning orders can also be created for a given requested order start date. In this case the algorithm is adapted as illustrated in FIG. 4. Note, that also in the case of forward scheduling an estimate of the lead time (in this case only the supplier lead time at 410) is used to check if the source of supply will still be valid at the time of the expected validity date.

In one embodiment, the LeadTime=Quantity*A+B. Factors A and B are calculated during RPPM generation and are persisted in the source of supply. Factors A and B are calculated from operation durations. Every operation may have a quantity-dependent and quantity-independent lead time (which includes production time, setup time, buffer time etc.). Master data maintenance allows parallel operations (in the first release master data maintenance allows only parallel segments, but the problems are the same). Of course parallel operations do not prolong total order lead time. Lead time calculation should therefore be based on the duration of the critical path. Unfortunately the critical path may be quantity dependent.

Figure 5A:
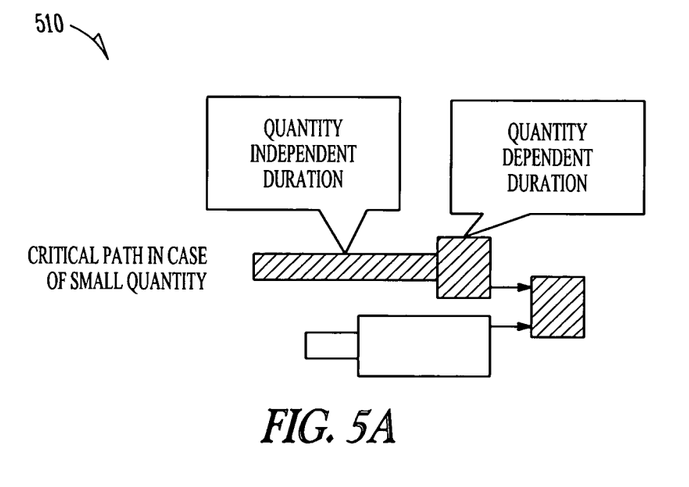
FIGS. 5A and 5B illustrate lead time calculations based on a critical path duration according to an example embodiment.
Figure 5B:
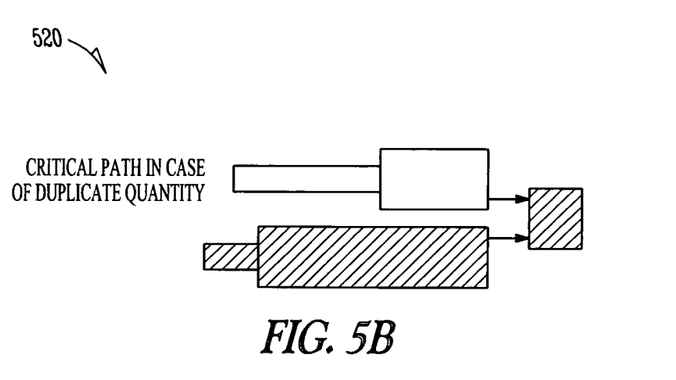

An example of critical paths in the cases of small quantities 510 and duplicate quantities 520 is illustrated in FIGS. 5A and 5B. The system therefore calculates a worst case assumption of the factors of the lead time. The quantity dependent fraction A of the lead time is the sum of quantity dependent operation lead times on the quantity dependent critical path. The quantity dependent critical path is calculated by ignoring all quantity independent durations of the operation network. The quantity independent fraction B of the lead time is the sum of quantity independent operation lead times on the quantity independent critical path. The quantity independent critical path is calculated by ignoring all quantity dependent durations of the operation network.

Lead time calculation is a worst case assumption not only because of the quantity dependence of the critical path. Actual production lead time may also be shorter than the estimated lead time. Not all operations may actually be needed. The necessity of an operation may depend on whether or not a component has to be built into the product. If the component is not built into the product, then the operation is not needed. Whether or not a component is built into the product may depend on product specification data, which is available only when creating production planning orders, not when generating the RPPM. Operations may be time-dependent. The operation is not copied from the RPPM into the production planning order if the operation is not valid at the explosion date. Note, that even if the lead time of the production planning order was overestimated it is still possible to create the order (which is not always true if the lead time was underestimated). The consequence will be some idle time between operations of the order or early availability of the produced material.

Figure 6:
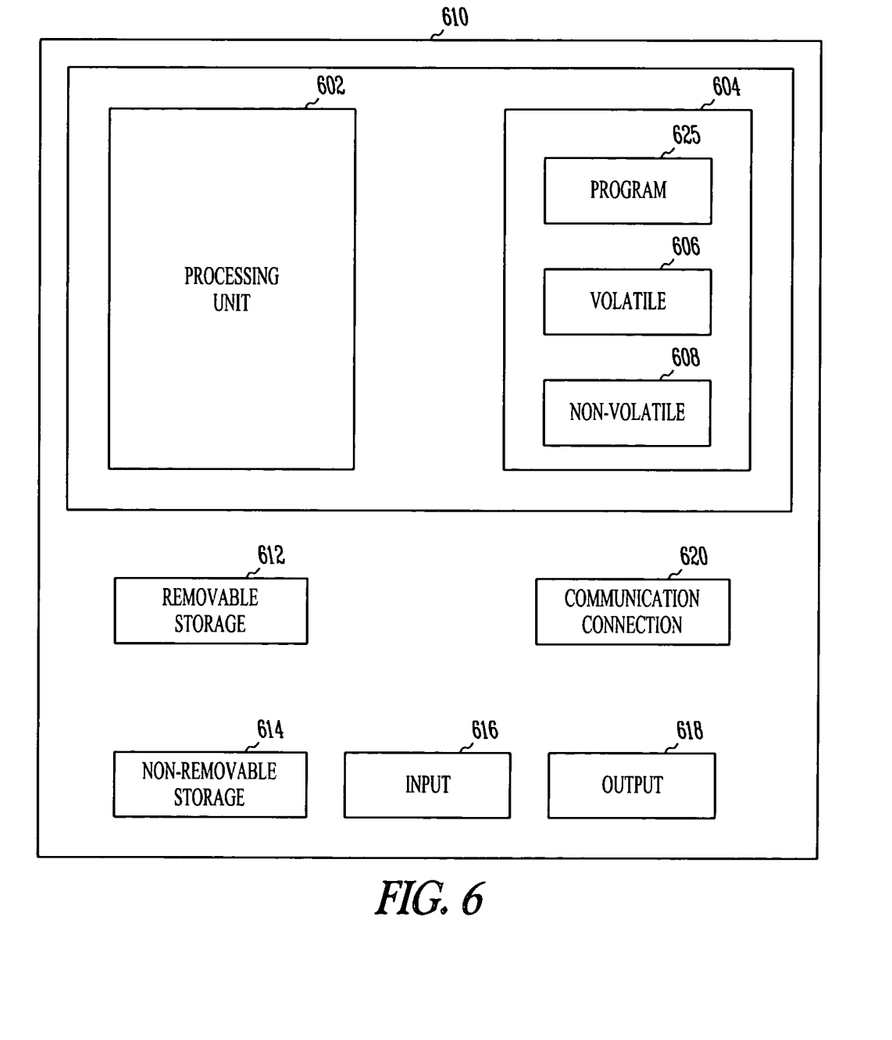
FIG. 6 is a block architecture diagram of a typical computer system for performing methods according to an example embodiment.

A block diagram of a computer system that executes programming for performing the above methods is shown in FIG. 6. A general computing device in the form of a computer 610, may include a processing unit 602, memory 604, removable storage 612, and non-removable storage 614. Memory 604 may include volatile memory 606 and non-volatile memory 608. Computer 610 may include—or have access to a computing environment that includes—a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 602 of the computer 610. A hard drive, CD-ROM, and RAM are some examples of articles including a computer-readable medium.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A method of scheduling manufacturing of a product by a requested availability date, the method comprising:
    selecting sources of supply from a database stored on a storage device for multiple components to be used for manufacturing the product;
    checking by a computer system if valid-to dates of the sources of supply extend at least to a plan start date;

calculating by the computer system lead times for sources of supply having a valid-to date extending at least to a plan start date;

selecting a source of supply as a function of a validity interval and a validity date, wherein the validity interval corresponds to an intersection of validity intervals of individual components determined from scheduled engineering changes to the manufacturing of the product and the validity date is determined as a function of the requested date and time to transfer the manufactured product to a consumer;

exploding a bill of materials corresponding to the multiple components with an explosion date within the validity interval:

receiving a scheduling change for manufacturing of the product;

determining a new explosion date based on the scheduling change; and re-exploding the bill of materials based on the scheduling change only the new explosion date is outside the validity interval.

2. The method of claimed wherein the validity date is calculated as the requested availability date minus a consumer lead time.

3. The method of claimed 2 and further comprising selecting the validity date as an explosion date.

4. The method of claimed 2 wherein the consumer lead time includes at least one of good receipt processing time for external procurement, transportation time for pick-up, and an estimate of quantity dependent production lead time for internal production.

5. The method of claimed 1 wherein the valid-to date is a function of supplier lead time which in claimed at least one of a planned delivery time, order-to-pick-up time, and make-to-order planning.

6. The method of claimed 5 wherein the valid-to date changes at midnight unless manually set otherwise, 7. The method of claimed wherein a bill of materials and a bill of operations data is defined in one production model and is compiled into a released planning production model (RPPM).

8. The method of claimed 7 herein the validity date is used for the explosion of the RPPM.

9. A method of scheduling manufacturing of a product by a requested order start date. the method comprising:

selecting sources of supply from a database stored on a storage device for a given material to be used for manufacturing the product;

checking by a computer system if a valid-to dates of the sources of supply extend at least to the requested order start date;

calculating lead times by the computer system for sources of supply having a valid-to date extending at least to the requested start date;

selecting a source of supply as a function of a validity interval of the sources and a validity date, wherein the validity interval corresponds to an intersection of validity intervals of individual components determined from scheduled engineering changes to the manufacturing of the product and the validity date is determined as a function of the requested date and time to transfer the manufactured product to a consumer;

selecting one of the remaining sources of supply to create a new order;

exploding a bill of materials Corresponding to the individual components with an explosion date within the validity interval;

receiving a scheduling change for manufacturing of the product;

determining a new explosion date based on the scheduling change; and re-exploding bill of materials base on the scheduling change only if the new explosion date is outside the validity interval.

10. The method of claimed 9 wherein the validity date is calculated as the requested availability date minus a consumer lead time.

11. The method of claimed 10 and further comprising selecting the validity date as an explosion date.

12. The method of claimed 10 wherein the consumer lead time includes at least one of good receipt processing time for external procurement, transportation time for pick-up, and an estimate of quantity dependent production lead time for internal production.

13. The method of claimed 9 wherein the valid-to date is a function of supplier lead time which in includes at least one of planned delivery time, order-to-pick-up time, and make-to-order planning.

14. A method of scheduling manufacturing of a product by a requested availability date, the method comprising:

selecting sources of supply from a database stored on a storage device for multiple components to be used for manufacturing the product having a valid-to date extending at least to a plan start date;

calculating by a computer system a consumer lead times for sources of supply having a valid-to date extending at least to a plan start date;

determining a validity date as the requested availability date mains consumer lead time;

calculating by the computer system a supplier lead time for selected sources of supply;

determining the validity date as the maximum of the validity date and the plan start date plus the supplier lead time;

removing by the computer system sources having a validity date less than the valid from date of the source;

removing by the computer system sources having a validity date greater than the valid-to date of the source; and selecting a source of supply that has not been removed as a function of a validity interval and the validity date, wherein the validity interval corresponds to an intersection of validity intervals of individual components determined from scheduled engineering changes to the manufacturing of the product;

exploding a bill of material corresponding to the multiple components with an explosion date within the validity interval:

receiving a scheduling change for manufacturing of the product;

determining a new explosion date based on the scheduling change; and re-exploding the bill of materials based on the scheduling change only it the new explosion date is outside the validity interval.

15. The method of claimed 14 wherein a new order for the given material is created for the selected source.

16. The method of claimed 15 and further comprising selecting the validity date as the explosion date, 17. A system for scheduling manufacturing of a product by a requested availability date, the system comprising:

means for selecting. sources of supply for given materials to be used for manufacturing the product;

means for checking if valid-to date of the source of supply extends at least to a plan start date;

means for calculating lead times for sources of supply having a valid-to date extending at least to a plan start date; and means for selecting a source of supply as, a function of a validity interval or the source and a validity date, wherein the validity interval corresponds to an intersection of validity intervals of individual materials determined from scheduled engineering changes to the manufacturing of the product and the validity date is determined as a function of the requested date and time to transfer the manufactured product to a consumer;

means for exploding a bill of materials corresponding to the multiple components with an explosion date within the validity interval;

means for receiving a scheduling change for manufacturing of the product;

means for determining a new explosion date based on the scheduling change; and means for re-exploding the bill of materials based on the scheduling change only if the new explosion date is outside the validity interval.

18. The system of claimed 17 wherein the validity date is calculated as the requested availability date minus a consumer lead. time and wherein the validity date is selected as an explosion date.

19. The system of claimed 17 wherein the valid-to date is a function of supplier lead time which inculudes at least one of planned delivery time, order-to-pick-up time, and make-to-order planning.

20. The system of claimed 17 wherein a bill of materials and a bill of operations data is defined in one production model and is compiled into a released planning production model (RPPM) and wherein the validity date is used for the explosion of the RPPM.

* * * * *